United States Patent [19]

Scott

[11] Patent Number: 4,897,843
[45] Date of Patent: Jan. 30, 1990

[54] FREQUENCY-AGILE LASER SYSTEMS

[75] Inventor: Peter B. Scott, Winchester, Mass.

[73] Assignee: Sparta, Inc., Lexington, Mass.

[21] Appl. No.: 341,699

[22] Filed: Apr. 21, 1989

[51] Int. Cl.$^4$ .............................................. H01S 3/10
[52] U.S. Cl. ...................................... 372/20; 372/12; 372/32; 372/105
[58] Field of Search ....................... 372/20, 12, 32, 33, 372/105, 27

[56] References Cited

U.S. PATENT DOCUMENTS

| 3,868,592 | 2/1975 | Yarborough et al. | 331/94.5 |
| 3,973,219 | 8/1976 | Tang et al. | 331/94.5 |
| 3,983,507 | 9/1976 | Tang et al. | 331/94.5 |
| 4,150,342 | 4/1979 | Johnston, Jr. et al. | 331/94.5 |
| 4,696,012 | 9/1987 | Harshaw | 372/99 |

OTHER PUBLICATIONS

Lopasov et al., vol. 28 *Optics & Spectroscopy* pp. 291–292 (1970).
Williams et al., paper, *SICOLS Conference Proceedings* (1983).

Primary Examiner—Léon Scott, Jr.
Attorney, Agent, or Firm—Thomas J. Engellenner

[57] ABSTRACT

A high-speed broadband tunable laser system is disclosed. In one illustrated embodiment, a microprocessor-controlled synchronous tunable laser system is disclosed having multiple tuning elements. The tuning elements can be individual birefringent crystals (such as potassium deuterated hydrogen phosphate) which exhibit electro-optic effects when electric field is applied. Two (or more) of such elements provide coarse and progressively finer control over the wavelength and linewidth. The appropriate voltage values for each element can be stored in a random access memory within a controller and retrieved immediately to obtain a desired wavelength within milliseconds without the scanning delays inherent in mechanical systems.

13 Claims, 4 Drawing Sheets

FREQUENCY-AGILE LASER SYSTEMS

BACKGROUND OF THE INVENTION

The technical field of this invention is laser systems and, in particular, tunable laser systems which can be rapidly tuned across, or to random lines within, a broadband wavelength spectrum by electro-optic effects.

Various techniques are known in the art for tuning laser radiation so as to change the wavelength of the laser beam. See, for example, U.S. Pat. No. 8,868,592 issued to Yarborough et al. on Feb. 25, 1975; U.S. Pat. No. 3,973,219 issued to Tang et al. on Aug. 3, 1976; U.S. Pat. No. 3,973,507 issued to Tang et al. on Sept. 30, 1976; U.S. Pat. No. 4,150,342 issued to Johnston, Jr. et al. on Apr. 17, 1979; and U.S. Pat. No. 4,696,012 issued to Harshaw on Sept. 22, 1987.

Most prior art techniques for tuning laser radiation rely upon mechanical movement of a tuning element (e.g., by rotation of one or more birefringent plates). A problem with mechanical tuning systems is that such systems often suffer from instability during use and are incapable of rapid tuning across a broadband of wavelengths. Environmental vibrations and accidents during use can lead to misalignment of the tuning elements. Moreover, the rate at which the mechanical tuning elements can be adjusted in such prior art systems is often the limiting factor in their tunability.

There exists a need for rapid tunable laser systems, as well as systems that permit rapid tuning over a continuous wavelength range, with a narrow line width. A reliable, rugged and precisely tunable laser would satisfy substantial need in the art.

SUMMARY OF THE INVENTION

A high-speed broadband tunable laser system is disclosed. In one illustrated embodiment, a microprocessor-controlled synchronous tunable laser system is disclosed having multiple tuning elements. The tuning elements can be individual birefringent crystals (such as potassium deuterated hydrogen phosphate) which exhibit electro-optic effects when electric field is applied. Two (or more) of such elements provide coarse and progressively finer control over the wavelength and linewidth.

In one aspect of the present invention, the appropriate voltage values for each element can be stored in a random access memory within a controller and retrieved immediately to obtain a desired wavelength within milliseconds without the scanning delays inherent in mechanical systems.

In another aspect of the invention, a feedback control means is provided for measuring the power and wavelength of the output beam and providing control signals to the tuning elements to adjust and optimize the system's performance. A two-stage wavelength monitor is disclosed in which a refraction measurement is used to obtain a rough estimate of the output wavelength and a digitizing diffraction analyzer is employed to refine the wavelength estimate.

Each of the tuning elements in the present invention can be formed from a birefringent crystal material cut so as to have an optical transmission path which is roughly aligned with the Z-axis of the crystal but offset from the Z-axis by a fixed angle (typically on the order of 5° or more). The crystal can be cylindrical with two or more electrodes disposed at opposite ends to tune light propagating through the crystal upon the application of a voltage across the electrodes. When a voltage is applied to the birefringent crystal, a frequency-modifying phenomenon, known as the electro-optic effect, is observed.

In order to achieve broadband tuning, the present invention makes use of the "modes" of the tuning crystals. Although many high gain modes for each tuning element may lie under the laser gain curve, appropriate voltages are applied to each of the tuning elements such that only one mode for each tuning element is overlapped, thereby permitting lasing at a precise wavelength. This "overlapping mode" phenomenon further permits linewidth narrowing.

The invention will next be described in connection with certain illustrated embodiments.

DETAILED DESCRIPTION

Figure 1:
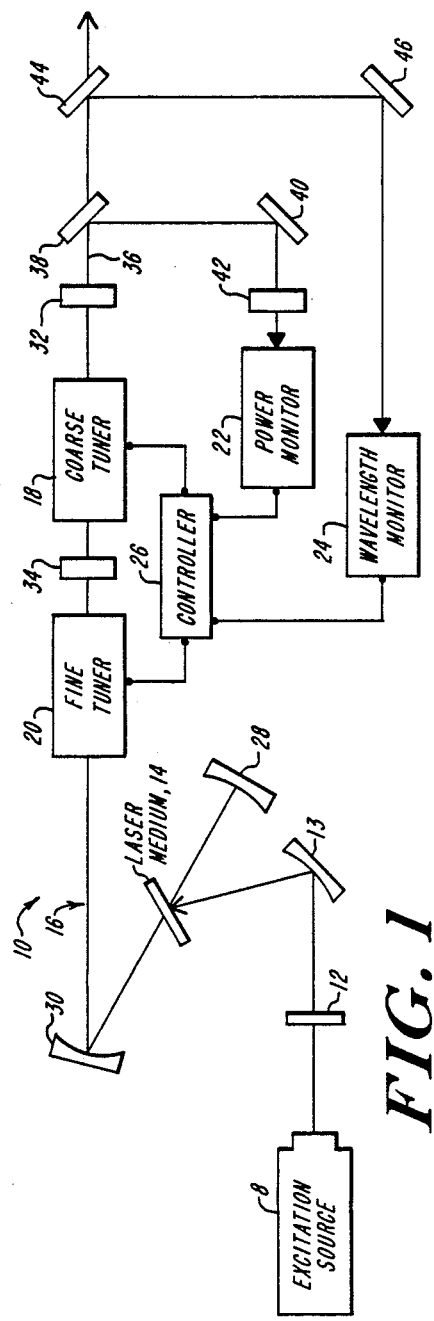
FIG. 1 is a schematic illustration of a tunable laser system according to the invention.

In FIG. 1 a broadband tunable laser system 10 according to the invention is shown including excitation energy input port 12, laser medium 14, resonant cavity 16, tuning elements 18 and 20, power monitor 22, wavelength monitor 24 and controller 26.

The laser medium 14 can be any laser medium capable of generating radiation over a broad band of wavelengths in response to excitation energy. For example, a free-flowing dye, such as Rhodamine 6G, Coumarin 6 or other organic laser dye can be employed. Alternatively, other liquid, gaseous semiconductor or solid state crystal laser media (including, for example, Argon ion lasers, gallium arsenide semiconductor lasers and $TiAl_2O_3$ solid state lasers) can be used so long as the medium is capable of broadband radiation emissions.

In the illustrated embodiment, laser medium 14 is a free flowing dye continuously delivered by a Pump (not shown). As the dye stream traverses the laser cavity 16, it is excited by an excitation source 8 which provides excitation energy via port 12 and mirror 13 to the medium 14. The excitation source 8 can be a pump laser, such as an Argon ion laser or a frequency-doubled YAG laser, or a variety of other pulsed or continuous wave sources of excitation energy. As shown in FIG. 1, the laser medium can also be configured as planar free-flowing stream disposed at Brewster's angle to the cavity axis so as to polarize the radiation from the excited medium (i.e., by rejecting the S component of the laser light).

Coarse tuning element 18 and fine tuning element 20 are disposed within the resonant cavity 16, which is delineated by end mirror 28, folding mirror 30, and partially transmissive end mirror 32. One or more wavelength decoupling elements 34 can also be disposed within the resonant cavity 16.

The tuning elements 18 and 20 are operated by signals from the controller 26, which can be implemented, for example, by one or more microprocessor boards. In the illustrated embodiment, the controller 26 operates in a closed loop feedback mode, adjusting the tuning elements 18 and/or 20 in response to measurements by power monitor 22 and wavelength monitor 24.

Power monitor 22 is coupled to the output beam 36 by beam splitter 38, mirror 40 and attenuator 42, which cooperate to strip off a portion of the output beam for measurement. The power monitor 22 can be of conventional design (e.g., a Model UDT-PIN-IOD monitor available from United Detector Technology, Hawthorne, CA) so long as it is sufficiently agile to read the output power in a feedback loop with the controller 26. Another portion of the output beam 36 is also stripped by beam splitter 44, and delivered via mirror 46 to the wavelength monitor 24.

Figure 2:
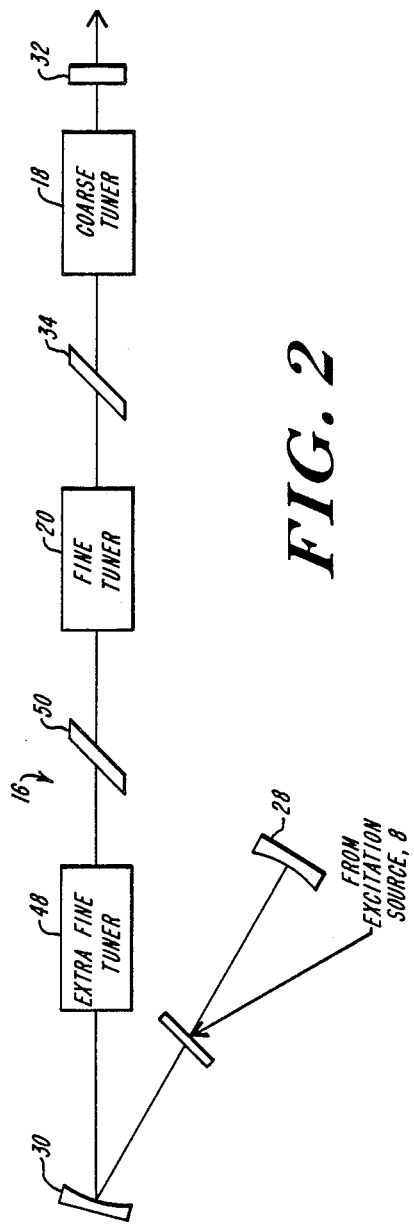
FIG. 2 is a more detailed illustration of a resonant cavity for use in a tunable laser system.

In FIG. 2, a more detailed embodiment of a resonant cavity 16 is shown including a coarse tuning element 18, a fine tuning element 20 and an extra fine tuning element 48. In one preferred embodiment discussed in more detail below, each of the tuning elements can be a birefringent crystal material, which manipulates the frequency and line width of light passing through it by electro-optic effects in response to an applied voltage.

As shown in FIG. 2, the resonant cavity 16 can further include a first decoupling element 34 and a second decoupling element 50, which serve to maintain the polarity of the light in the system by attenuating S components which might otherwise build up during multiple passes through the cavity. The decoupling elements 34 and 50 can be constructed, for example, from one or more transmissive (e.g., fused silica) elements disposed at Brewster's angle to the cavity axis. The coarse, fine, and extra-fine tuners require successively higher natural birefringence to accomplish progressive line narrowing when used as a cascading system. The tuning elements preferably have end surfaces disposed of Brewster's angle to the laser beam path or include anti-reflective coatings to minimize losses.

Figure 3:
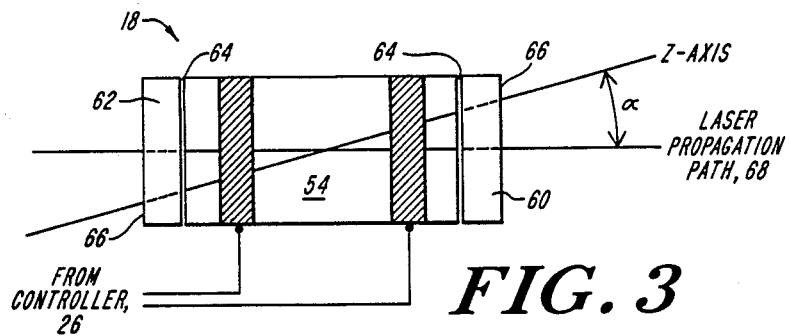
FIG. 3 is more detailed illustration of a coarse tuning element for use in the present invention.

In FIG. 3, the structure of a coarse tuning element 18 is shown in more detail including a birefringent crystal material 54 cut so as to have a optical transmission path 68 which is roughly aligned with the Z-axis of the crystal but offset from the Z-axis by a fixed angle (typically on the order of 5 degrees or more). The crystal 54 can be cylindrical and composed of a birefringent material such potassium deuterated hydrogen phosphate (KD*P) or the like. Tuner 18 further includes optically transmissive windows 60 and 62, each of which is treated with an anti-reflective (AR) coating 66. The windows can be applied to the end faces of crystal 54 with an index matching glue or oil 64.

Deployed at opposite ends of the crystal are electrodes 56 and 58 which can be, for example, indium metal rings with appurtenant electric contacts and leads for applying a voltage across the crystal. In one preferred embodiment of the invention a voltage ranging from about zero to about ±1000 volts is applied to crystal 54 by controller 26.

When a voltage is applied to a birefringent material, a frequency-modifying phenomenon, known as the electro-optic effect, is observed. This effect is based upon the principle that the refractive index in certain media can be highly influenced by the intensity of an electric field. A electro-optic material, such as KD*P, can be made to tune light by applying a high voltage across the material. The wavelength/voltage relationship, referred to as the "tuning rate," is fairly linear and can be expressed in units of nanometers per kilovolt. For a more detailed description of the electro-optic effects which are exhibited by birefringent crystals in response to an applied voltage, see for example, Lopasov et al., "Laser Frequency Control By Means of Birefringent Crystals" Vol. 28, *Optics and Spectroscopy* pp. 291–292 (1970).

Figure 4:
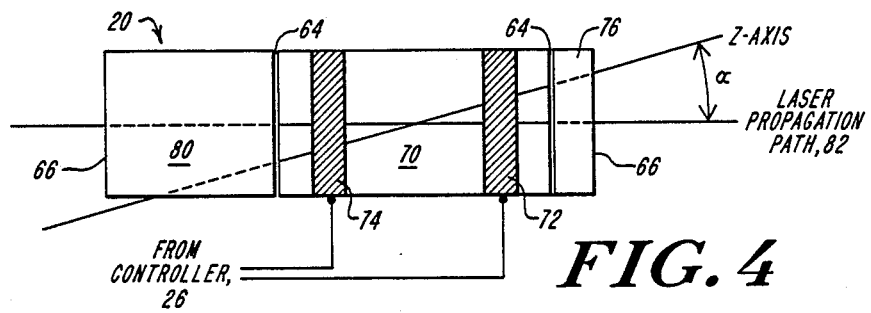
FIG. 4 is a more detailed illustration of a fine tuning element for use in the present invention.

In FIG. 4, the structure of a fine tuning element 20 is shown in more detail again including a birefringent crystal material 70 cut so as to have a optical transmission path 82 which is roughly aligned with the Z-axis of the crystal but offset from the Z-axis by a fixed angle (again typically on the order of 5 degrees or more). The crystal 70 likewise can be cylindrical and composed of a birefringent material such potassium deuterated hydrogen phosphate (KD*P) or the like. Tuner 20 similarly includes optically transmissive windows 76 and 80, treated with anti-reflective (AR) coatings 66 and applied to the end faces of crystal 70 with an index matching glue or oil 64.

In tuner 20 as shown in FIG. 4, a finer tuning rate is achieved by the use of a bulk birefringent material as window element 80 and the application of a higher voltage to crystal 70. The window material 80 can be chosen from a variety of birefringent materials, such as quartz or magnesium fluoride for example. The window material 80 is also preferably an X-cut or Y-cut crystal to provide additional birefringence to the laser beam 82 passing through it. Electrodes 72 and 74 again can comprise metal rings with appurtenant electric contacts and leads for applying a voltage across the crystal 70. In one preferred embodiment a voltage ranging from about zero to about ±2500 volts is applied to crystal 54 by controller 26.

Figure 5:
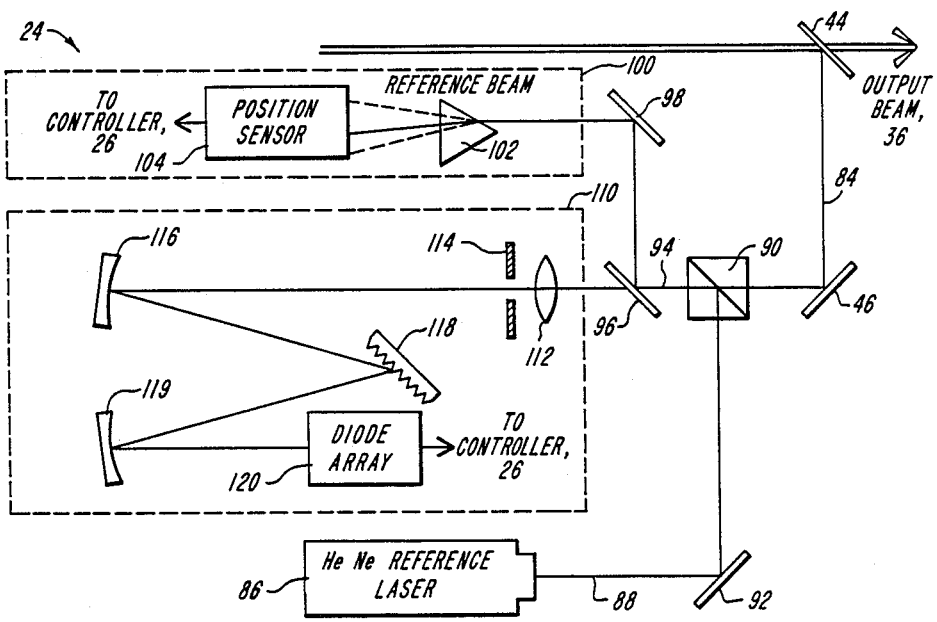
FIG. 5 is a more detailed illustration of a wavelength monitor for use in the present invention.

FIG. 5 is an illustration of a wavelength monitor 24 useful in providing feedback control signals to controller 26. As shown, wavelength monitor 24 includes a reference laser 86 (e.g., a HeNe laser commercially available from Melles-Griot Corp., Cupertino, CA operating to produce a reference beam at 6328 angstroms), a beam combiner 90, a rough estimation wavemeter 100, and a fine estimation wavemeter 110.

In wavelength monitor 24 a portion 84 of the beam 36 of a tunable laser is stripped by beam splitter 44 and delivered via mirror 46 to a beam combining element 90. At the same time a reference beam 88 from reference laser 86 is delivered via mirror 92 to the beam combiner 90. The output of element 90 is a combined beam 94 which is delivered via splitter 96 and mirror 98 to both wavemeters 100 and 110. The various optical elements described herein, including the beam splitters and beam combiner 90 are available from various commercial sources (e.g., CVI Laser, Inc., Livermore, CA).

In the rough estimation wavemeter 100, the combined beam 94 is transmitted through prism 102 (or any similar refractor) to position sensor 104. The original output beam and the reference beam will undergo different degrees of refraction as each passes through the prism 102 and therefore illuminate the different regions of position sensor 104. This difference provides a rough estimate of the wavelength (on the order of about 0.5 nanometers) for controller 26. When a silicon photosensitive position sensor (available, for example, from the Reticon Division of EGG Corporation, Salem, MA) a continuous output can be read about every 10 microseconds or less.

The refined estimation wavemeter 110 can be constructed as an Ebert monochromator, in which the combined beam 94 passes through focusing lens 112 and slit aperture 114 and then is focused via mirror 116 onto a diffraction grating 118 or the like. For a given wavelength, a subset of the resulting orders diffracted from the grating 118 are then imaged onto diode array 120 to provide a refined estimate of the output wavelength for controller 26. The diode array 120 can be a conventional diode line scan camera (e.g., a model LC1901 available from Reticon Div. of EG&G, Salem, MA) and can employ weighted (e.g., grey scale) averaging or the like to achieve highly precise (subpixel) location of the diffraction grating orders.

Data from the rough and fine estimation wavemeters are processed together to precisely define the wavelength of the output beam. In one preferred embodiment, the rough estimate is employed in a lookup table to determine where the diffraction grating orders should be for any given wavelength. The data from the refined estimated is then compared by controller 26 to the known grating order locations and interpolated, if necessary, to obtain a precise wavelength readout.

The controller 26 preferably includes a general purpose high speed microprocessor (e.g., an ADSP2100 processor available from Analog Devices, Norwood, MA) and auxiliary processor cards or the like to read the outputs of the rough and fine estimation wavemeters 100 and 110, respectively. Such hardware can include, for example, an analog conversion board (e.g., Model DAS-20 Metrabyte board Taunton, MA) and data processing boards (e.g., Girard Model 2100 and 2200 processor boards, Girard Corporation, Afton, MN). However, it should be clear that various other dedicated hardware, firmware or software products can be substituted to perform the data processing and control functions of controller 26.

Figure 6:
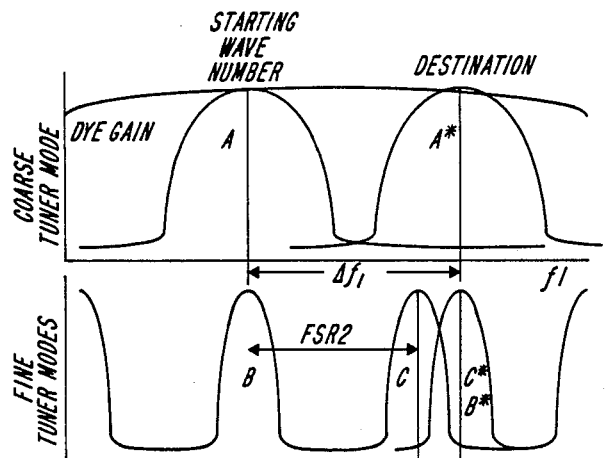
FIG. 6 is a graph of amplitude versus frequency illustrating the tuning modes of a coarse and fine tuning element according to the present invention.

In order to achieve broadband tuning, the present invention makes use of the "modes" of the tuning crystals. FIG. 6 shows the modes of the coarse and fine tuners. The top graph of FIG. 6 shows how the laser linewidth is narrowed by the coarse tuner.

The free spectral range (the distance between the modes), or FSR of the coarse tuner is such that only one mode of the coarse tuner is present under the dye gain curve and may be shifted to a different center frequency by applying a voltage across its electrodes. The bottom part of the figure shows that many modes of the fine tuner may be present under the dye gain curve, but its FSR is large enough so that only one mode may be under the coarse tuner mode. The laser linewidth is further narrowed by the fine tuner as shown by its mode shape.

With reference to FIG. 6, the laser is tuned by applying a voltage to the tuning crystal(s). If only the "coarse" tuner is used in the laser cavity and a voltage is applied, its mode "envelope" will be shifted from A to A*, changing the laser's frequency by $\Delta f_1$. The laser would then lase at the center frequency of A* with a linewidth dictated by the mode shape of the coarse tuner. If the fine tuner is also Present in the cavity, a voltage could be applied to its electrodes which would shift mode B to B*. If the change in wavelengths between these two points is much more than three nanometers, an excessive voltage would be required. Another way, requiring much lower voltages is to allow "mode hopping". If no voltage is applied to the fine tuner, a mode hop from B will occur and the lase will lase as determined by the frequency envelope C. In order to achieve the desired destination frequency, a much smaller voltage may be applied to the fine tuner so that its envelope, C, is shifted by $\Delta f_1$ to C* (note that C* is in the same position as B* but is a different mode). The problem then becomes the computation of $\Delta f_1$ by the FSR of the fine tuner, and taking the fractional part. In other words, if the distance $\Delta f_1$ is 1.25 free spectral ranges of the fine tuner, $\Delta f_2 = 0.25$.

Figure 7A:
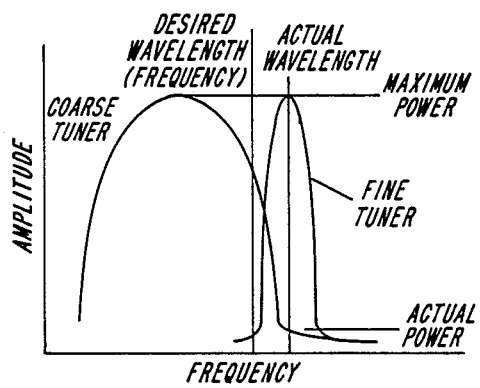
FIGS. 7A-7D are graphs of amplitude versus frequency, depicting various stages in the operation of a laser system with two tuning elements according to the invention.
Figure 7B:
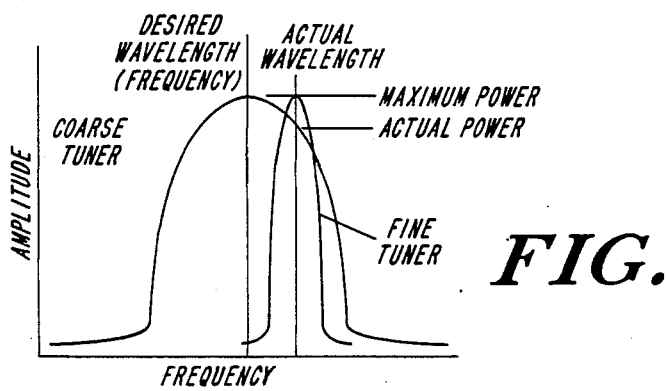
Figure 7C:
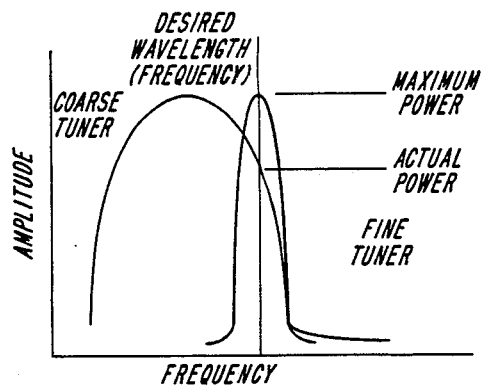
Figure 7D:
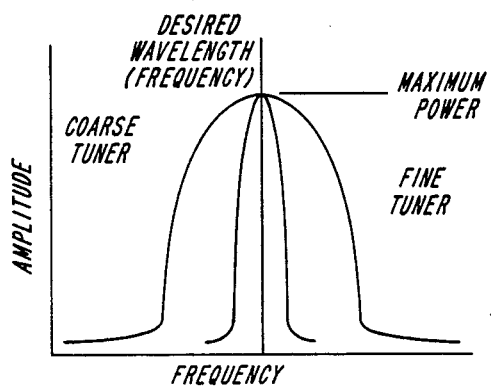

In FIGS. 7A–7D the tuning parameters are further illustrated. FIG. 7A illustrates the situation where incorrect voltages on both the coarse and fine tuners result in no lasing. FIG. 7B show the results if the course tuner is correct but the fine tuner is off; the laser will lase at the wrong wavelength. FIG. 7C illustrates the situation where the fine tuner is correct but the course tuner is off, with the result being that lasing occurs at the correct wavelength but at a power substantially less than maximum. Finally, FIG. 7D illustrates correct voltages on both tuners; lasing occurs at the right wavelength and at maximum power.

Figure 8:
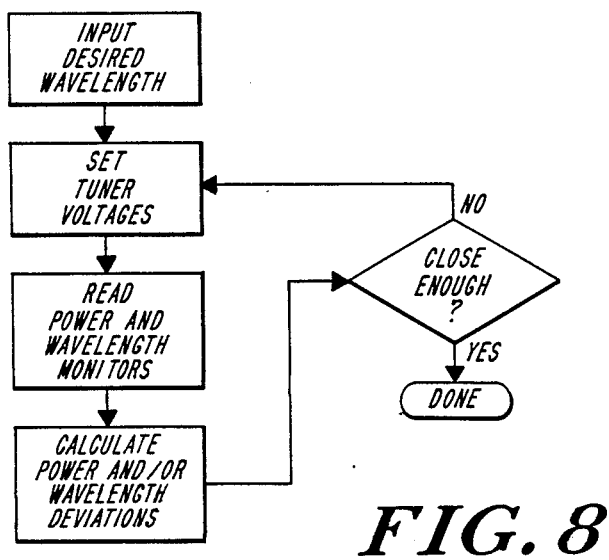
FIG. 8 is a flow chart further illustrating the functions of a controller for use in a tunable laser system according to the invention.

By appropriate monitoring of the both the output power and the actual wavelength, rapid and precise tuning of a broadband laser system can be achieved in accordance with the Present invention. FIG. 8 is a flow chart illustrating a simple feedback control protocol that can be implemented by the controller in accordance with the invention. In this protocol the desired wavelength is inputted by the operator and initial tuner voltages are set by the controller (e.g., from empirical data stored in a lookup table or by calculation) the output of the power and wavelength monitors are then read and any deviations from expected power or wavelength are detected and quantified. A decision is then made as to whether the output values are close enough to the desired values. If they are not, the controller calculates a new set of voltages which should bring the output beam into conformity with the desired values. The output is again measured and the iterative process repeated until the deviation from deviation from desired values is essentially eliminated.

Although several embodiments of the invention have been described, it should be clear that various changes, additions or subtractions can be mad by those skilled in the art without departing from the spirit or scope of the invention. For example, the number and placement of tuning elements within the resonant cavity can be varied and the tuning elements can take alternative forms or configurations. The resonant cavity, itself, can be a ring cavity rather than a linear cavity. Additionally, although the illustrated embodiments show discrete decoupling elements associated with each tuner as well as window elements of varying lengths to provide different degrees of birefringence, the system can also be configured so that the birefringent materials which change the optical path length for the different tuning elements, also serve as decoupling elements. In such an alternative embodiment, the birefringent windows would also include end surfaces disposed at about Brewster's angle to eliminated undesirable polarizations. Moreover, the controller for adjustment of the tuning elements can include a highspeed, low inductance, driving amplifier to damp voltage changes and protect against voltage surges and the lookup tables used in the controller can be adaptively revised during operation. Further two or more of the tunable laser systems of the present invention can be used together, for example using different dyes or other laser media, to produce complementary output beams to provide a wider spectrum of wavelengths.

What is claimed is:

1. A tunable laser system comprising:
   a laser for the generation of laser radiation over a broadband wavelength spectrum in response to excitation by a source of excitation energy;
   a first intracavity electric optic tuning element providing coarse wavelength selection;
   at least one further intracavity electro-optic tuning element providing fine linewidth control over wavelength selection by an electro-optic effect; and
   control means for measuring the laser radiation and providing control signals to said tuning elements to adjust and optimize performance.

2. The system of claim 1 wherein said laser is a dye laser.

3. The system of claim 1 wherein at least one of said tuning elements is a birefringent crystal.

4. The system of claim 1 wherein at least of one of said tuning elements is a potassium deteurated phosphate crystal.

5. The system of claim 1 wherein the control means further includes means for monitoring the power of the laser radiation.

6. The system of claim 1 wherein the control means further includes means for monitoring the wavelength of the laser radiation.

7. The system of claim 1 wherein the control means further includes a random access memory for storing wavelength adjustment parameters.

8. The system of claim 7 wherein the wavelength monitoring means further includes a rough estimation wavemeter and a refined estimation wavemeter.

9. The system of claim 8 wherein the rough
   on wavemeter further includes means for measuring the refraction of the output beam in comparison to a reference beam.

10. The system of claim 8 wherein the refined estimation wavemeter further includes means for analyzing diffraction grading orders derived from said laser radiation.

11. The system of claim 1 wherein the system further includes means for polarizing the laser radiation.

12. The system of claim 1 wherein the system further includes at least one decoupling element for elimination undesired polarization states.

13. The system of claim 1 wherein the system further includes a biasing plate to narrow the line width of the laser radiation.

* * * * *